March 12, 1963 V. STANZEL 3,080,676
JET PROPELLED MODEL AIRCRAFT
Filed Feb. 19, 1959 2 Sheets-Sheet 1
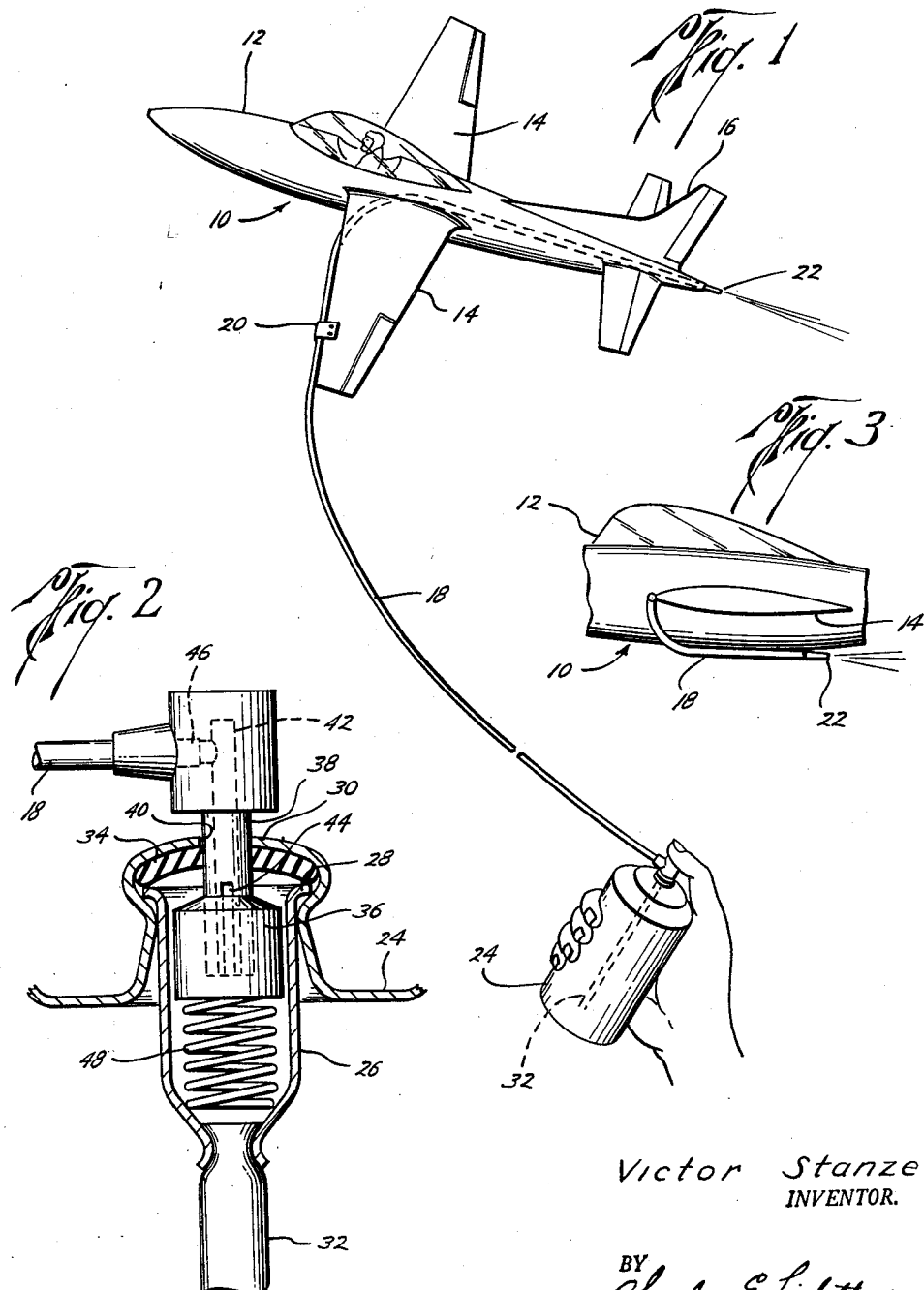
Victor Stanzel
INVENTOR.
BY Charles E. Lightfoot
ATTORNEY

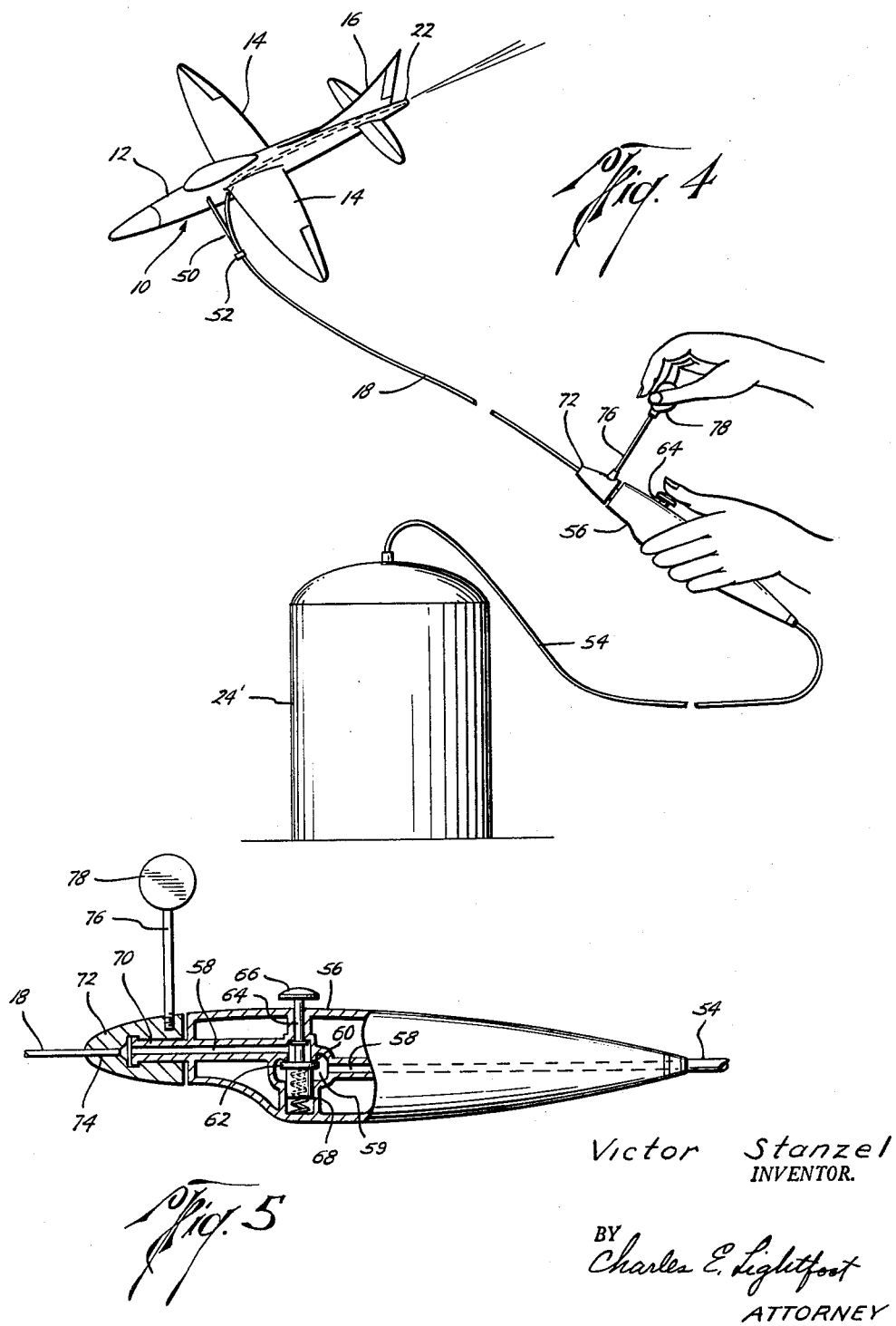

United States Patent Office 3,080,676
Patented Mar. 12, 1963

3,080,676
JET PROPELLED MODEL AIRCRAFT
Victor Stanzel, P.O. Box 171, Schulenburg, Tex.
Filed Feb. 19, 1959, Ser. No. 794,401
8 Claims. (Cl. 46—77)

This invention relates to model aircraft, and more particularly to a model airplane which is adapted to be propelled by pressure fluid from a source located at a distance from the aircraft.

The invention has for an important object the provision of a model or toy aircraft, which is operated by jet propulsion mechanism, and embodying means for supplying fluid under pressure to such mechanism while the craft is in flight from a source of supply located on the ground and which is under the control of an operator.

Another object of the invention is to provide a model aircraft which is jet propelled, embodying a flexible tubular supply line through which fluid under pressure may be supplied to the jet propulsion mechanism from a source located at a distance, and which supply line is operable to control the direction of flight of the aircraft.

Another object of the invention is the provision of a jet propelled model aircraft which is constructed so that its center of gravity is located to cause the aircraft to nose downwardly in flight and having jet propulsion mechanism which is arranged to overcome the tendency of the aircraft to nose downwardly and cause the aircraft to rise, such mechanism including means for supplying pressure fluid from a source located at a distance and which may also be operated to control the direction of flight of the aircraft.

The invention also contemplates the provision of apparatus for delivering power to toys or other mechanism for operation of the same by means of the pressure exerted by an expanding gas or vapor.

A further object of the invention is the provision of apparatus for delivering power to mechanism which is adapted to be actuated by an expansible pressure fluid having a high vapor pressure, and including means for storing a supply of such fluid in liquid form under pressure and for dispensing the fluid and supplying the same in a gaseous or vaporous state to the mechanism to be operated.

The above and other important objects and advantages of the invention will be apparent from the following detailed description, constituting a specification of the same, when considered in conjunction with the annexed drawings, wherein—

FIGURE 1 is a perspective view illustrating a preferred embodiment of the invention, showing the aircraft in flight and the manner in which the flight of the aircraft may be controlled;

FIGURE 2 is a detail view on a greatly enlarged scale, illustrating a control valve by which the supply of pressure fluid from a source remote to the aircraft may be controlled by an operator to control the flight of the aircraft, the valve being shown in open position;

FIGURE 3 is a fragmentary, side elevational view, on a somewhat enlarged scale, illustrating a modified form of the invention, wherein the jet of the jet propulsion mechanism is located at a different location relative to the fuselage of the aircraft, than that illustrated in FIGURE 1;

FIGURE 4 is a perspective view on a somewhat reduced scale, illustrating a modified form of the mechanism by which the supply of pressure fluid to the jet propulsion mechanism of the aircraft is controlled, and including a somewhat different form of the means for controlling the direction of flight of the aircraft; and FIGURE 5 is a side elevational view, partly broken away and partly in cross-section and on an enlarged scale showing details of construction and the arrangement of parts of the supply valve and flight control mechanism illustrated in FIGURE 4.

Referring now to the drawings in greater detail, the invention is illustrated herein in connection with a model or toy aircraft, generally designated by the numeral 10, which is preferably of the jet propelled type, having a fuselage 12 of conventional shape, and provided with the usual wings 14 and tail structure 16 of aircraft of this general type. The model aircraft of the invention is preferably of molded construction formed of plastic material, to provide a thin-walled body which is of extremely light weight, so that a minimum of power is required to maintain the craft in flight.

In the form of the invention illustrated in FIGURE 1, the aircraft is provided with a flexible, tubular, pressure fluid supply and control line 18, preferably formed of relatively thin-walled plastic material, and of relatively small diameter, through which fluid under pressure may be supplied to the jet by which the aircraft is propelled. This pressure fluid supply and control line is anchored to one of the wings 14 of the aircraft, as indicated at 20, at a location laterally of the longitudinal axis of the craft, and extends into and axially along the fuselage and has its outlet end 22 located to discharge the pressure fluid rearwardly in the vicinity of the rear end of the fuselage, to provide a jet by which a forward thrust is exerted on the craft.

The aircraft of the invention may be constructed in a manner such that its center of gravity is located to cause the aircraft to normally nose downwardly, and the jet or outlet end of the line 18, under these conditions, may be directed somewhat upwardly at a slight angle to the longitudinal axis of the craft, to overcome the tendency of the craft to nose downwardly and cause the craft to rise under the influence of the pressure of fluid discharged from the jet.

The pressure fluid supply and control line 18 may be of any desired length, and extends to a location on the ground remote from the aircraft, the inlet end of the line being connected in communication with a suitable source of fluid under pressure, under the control of suitable valve mechanism adapted to be operated by the user to control the supply of pressure fluid to the jet.

In the form of the invention illustrated in FIGURES 1 and 2, the supply source of pressure fluid for the operation of the aircraft takes the form of a container 24, which may be of conventional character, such as a metal can, adapted to hold a supply of fluid under relatively high pressure, and provided with suitable valve mechanism, such as that illustrated in FIGURE 2, by which the discharge of fluid under pressure from the container through the supply and control line 18 may be controlled.

In the present illustration, the control valve mechanism takes the form of a cylindrical valve casing or housing element 26, which is provided at its upper end with an external annular flange 28, adapted to be crimped or otherwise secured in an upwardly extending hollow projection 30 formed on the top of the container, and connected at its lower end in communication with a downwardly extending tubular inlet pipe 32, which extends downwardly nearly to the bottom of the container, and through which fluid in the container may flow into the valve housing. Suitable seal forming means, such as the resilient washer 34, is provided within the extension 30 of the container, which is positioned to form a fluid tight seal between the upper end of the housing and the inner wall of the container. The valve mechanism has a plunger 36 movably disposed in the housing for longitudinal movement therein, and provided with an upwardly extending stem 38 which is slidably extended through a central opening in the sealing element 34 and through a central opening 40 in the top of the extension 30. The stem 38 has a longitudinal bore 42, which opens into the valve housing through a side slot 44, and which is also in communication with an outlet passageway 46 leading into the inlet end of the pressure fluid supply line 18. The plunger 36 is urged upwardly in the housing by a coil spring 48, and when the plunger is in its uppermost position in the housing, the side slot 44 is positioned to be closed by the seal forming element 34 to prevent the outflow of fluid from the interior of the housing into the pressure fluid supply line 18 through the bore 44 and passageway 26. When the plunger 36 is moved downwardly in the housing, however, against the pressure of the spring 48, the side slot 44 will be below the seal forming element 34 so that pressure fluid may flow from the housing through the slot into the bore 42, from whence the fluid flows out through the passageway 46, and through the pressure fluid supply line 18 to the jet. Thus, the valve is normally held in closed position by the spring 48, and when it is desired to supply fluid under pressure to the jet 22 to operate the aircraft, the stem 38 of the valve is depressed by the user, in the manner illustrated in FIGURE 1, to move the plunger downwardly to open the side slot 44, whereupon fluid under pressure may flow through the inlet pipe 32 into the valve housing and out through the valve stem into the pressure fluid supply line. Immediately upon release of the plunger, when the user releases the downward pressure on the valve stem, the plunger will be moved upwardly by the spring 48 to position the side slot 44 within the seal forming element 34, to shut off the outflow of pressure fluid.

Any suitable pressure fluid may be utilized to operate the aircraft, but a fluid is preferably used which is liquid under the pressure at which it is desired to load the supply container, and which is converted into a gaseous state immediately upon the release of such pressure. For this purpose, the substances commonly known as Freon, which are liquid when held under pressure and which immediately transform to a gaseous state upon release, is preferred. This material, which is commonly used as a refrigerant, is loaded into the supply container under pressure and forms a liquid therein, so that upon opening of the control valve, with the container held in the position shown in FIGURE 1, the liquid may flow upwardly through the outlet pipe 32 and into the supply line 18, wherein the liquid is immediately converted into a gaseous state, and is discharged from the jet 22 as a vapor or gas to exert a thrust on the aircraft sufficient to propel the craft.

Under some conditions, the supply container 24 may be inverted from the position illustrated in FIGURE 1, so that the inlet end of the outlet tube 32 will be positioned above the level of the liquid in the container and when used in this manner pressure fluid in the form of a gas will be supplied to the supply line 18 to propel the aircraft.

Various materials which are capable of being liquified under pressure and which vaporize or gasify upon release of the pressure thereon may be employed as a propellant in operating the invention. The methane and ethane derivatives commonly known under the name "Freon" are particularly desirable for this purpose because of the relative ease with which they may be obtained and kept in a liquid condition; the fact that these substances are non-toxic in character and non-inflammable, and also that they have a relatively high vapor pressure. The propellants may be used alone or mixed together in various proportions to obtain different pressure characteristics at various temperatures.

Trichloramonofluoromethane, the product commonly known as Freon-12, for example is well suited for use by the method of the invention since this material may be stored in pressure cans at 70° Fahrenheit at a pressure of 70 pounds per square inch, and the pressure in the cans remains substantially constant during the dispensing of the material in the apparatus of the invention until all of the liquid has been transformed into a gas. For this reason Freon-12 is preferred as a propellant for use in the apparatus of the invention.

Similar substances to Freon-12, such as, dichlorodifluoromethane (Freon 11); dichlorotetrafluoroethane (Freon 114); monochlorodifluoromethane, (Freon 22); and trichlorotrifluoroethane (Freon 113); may be used, either alone or in admixture in the apparatus of the invention depending upon the temperature and/or pressure characteristics which may be desired.

In the operation of the apparatus, making use of Freon-12 or other suitable propellant of the type mentioned, the pressure fluid supply line 18 serves as an expansion chamber in which the liquid or vaporous propellant will be transformed into a gas, so that a maximum volume of the propellant is discharged as a gas through the jet to secure the most advantageous use of the propellant in operating the aircraft or other device.

A somewhat modified form of the invention is illustrated in FIGURE 3, wherein the jet or outlet end of the pressure fluid supply line is positioned at a location forwardly of the rear end of the craft and at a point closer to the center of gravity of the same, so that the direction of discharge, or the angle at which the jet is directed relative to the longitudinal axis of the craft, is less critical than is the case when the jet is located at the rear end of the craft. It will be apparent that when the jet is positioned at the extreme rear end of the craft, a very slight change in the angle of the jet relative to the longitudinal axis of the craft may cause a substantial change in the upward or downward movement of the craft in flight. When the jet is located as illustrated in FIGURE 3, however, because of the proximity of the jet to the center of gravity of the craft, a greater change in the angle of the jet relative to the longitudinal axis of the craft will be necessary to cause a corresponding upward or downward movement of the craft in flight.

A somewhat modified form of the pressure fluid supply and control mechanism of the invention is illustrated in FIGURES 4 and 5, wherein the aircraft may be of the same character as that previously described. In the event that it is desired to connect the pressure fluid supply line 18 to the fuselage at a point forwardly of the wings 14, the craft may be provided with an outrigger or strut 50, extending laterally from the fuselage at a location forwardly of the wings and to whose outer end the supply line 18 is anchored, as indicated at 52. In other respects, the aircraft of this form of the invention is similar to and operates in the same manner as the form of the invention illustrated in FIGURE 1.

In this modified form of the invention, the source of supply of fluid under pressure may take the form of a relatively large container 24' adapted to hold a relatively large volume of pressure fluid, and provided with an outlet pipe 54, in the form of a flexible tube, which leads to the inlet end of the pressure fluid supply line 18 under the control of combined control valve and flight control mechanism, such as that shown in detail in FIGURE 5.

The combined valve and control mechanism of this form of the invention comprises a hollow casing 56, preferably of molded construction, formed of plastic or other suitable material, and having an internal partition or wall, through which a flowway 58 extends, and which is formed with an internal enlargement 59, within which a valve seat 60 is formed surrounding the flowway. A valve 62 is positioned in the enlargement 59 in position for movement into and out of closing relation to the seat 60, and has a valve stem 64 which is slidably extended through the wall of the housing and provided at its outer end with a button 66 which may be depressed to open the valve. A coil spring 68 is positioned in the enlargement 59 in position for coaction with the valve to yieldingly hold the valve in closed position.

At its forward end, the housing 56 has a tubular extension 70, through which the flowway 58 extends, and upon which a rotatable member 72 is mounted. The rotatable member 72 has an opening 74, through which the supply line 18 may be extended to position the inlet end of the supply line in communication with the flowway 58, and the supply line may be cemented or otherwise secured to the rotatable member for rotation therewith. The rotatable member is provided with an operating handle 76, having a knob 78 at its outer end by which the rotatable member may be conveniently turned on the casing.

In using this modified form of the invention, the casing 56 may be held in the hand of the user, as illustrated in FIGURE 4, so that the valve stem 64 may be depressed to open the valve, to permit pressure fluid to flow from the supply container 24' through the supply line 18 to the jet 22 to operate the aircraft. With the casing thus held by the user, and the valve 60 in open position, the flight of the aircraft may be readily controlled by rotating the rotatable member 72. Thus, upon rotation of the rotatable member in a clockwise direction, looking toward the aircraft, as illustrated in FIGURE 4, a torque or twist will be applied to the supply line 18 in a direction to cause the craft to change its direction upwardly in flight, and upon rotation of the rotatable member 72 in a counter clockwise direction, a torque or twist will be applied to the supply line in a direction to cause the aircraft to move downwardly in flight.

By providing a supply container 24', of relatively large capacity, it will be apparent that a supply of air or the like under pressure, may be maintained sufficient to operate the aircraft for a substantial period of time without replenishment.

It will thus be seen that the invention, constructed and operated in the manner described above provides a model jet propelled aircraft of simple design having means for supplying fluid under pressure to the jet propulsion mechanism from a location on the ground remote from the craft, as well as means for controlling the rising and descending movements of the craft in flight.

The invention is disclosed herein in connection with certain specific embodiments of the same, but it will be understood that these are intended by way of illustration only, and that numerous changes can be made in the construction and arrangement of the various parts within the spirit of the invention and the scope of the appended claims.

Having thus clearly shown and described the invention, what is claimed as new and desired to secure by Letters Patent is—

1. In a model aircraft which is solely aerodynamically supported for free upward and downward turning movement in flight having a fuselage and wings and whose center of gravity is located to cause the aircraft to tend to nose downwardly in flight, a flexible, tubular, pressure fluid supply line connected to the fuselage whose outlet end is located to discharge fluid under pressure in a direction to exert a forward thrust on the aircraft tending to cause the aircraft to turn upwardly in flight, and whose inlet end is located at a point remote from the aircraft, and means for supplying fluid under pressure to the inlet end of the supply line.

2. In a model aircraft having a fuselage, a flexible, tubular, pressure fluid supply line connected to the fuselage whose outlet end is positioned to discharge fluid under pressure in a direction to exert a forward thrust on the aircraft and whose inlet end is located at a point remote from the aircraft, a portable container for a volatile liquid under pressure, capable of being held in the hand, a discharge pipe extending into the container whose inlet end is located in spaced relation to the bottom of the container and whose outlet end is connected directly to the inlet end of the supply line and means for regulating the outflow of fluid through said pipe.

3. In a model aircraft having a fuselage, a flexible, tubular, pressure fluid supply line connected to the fuselage whose outlet end is positioned to discharge fluid under pressure in a direction to exert a forward thrust on the aircraft and whose inlet end is located at a point remote from the aircraft, a container for a volatile liquid under pressure, a discharge pipe extending into the container whose outlet end is connected in communication with the inlet end of the supply line and whose inlet end is positioned to be below the level of the liquid in the container to supply liquid to the supply line in one position of the container and above such level to supply liquid free fluid to the supply line when the container is in another position, and means for regulating the outflow of fluid through the pipe.

4. In a model aircraft adapted to be propelled by fluid under pressure and having a fuselage and laterally extending wings, a flexible, tubular, pressure fluid supply line connected to one of the wings at a location laterally spaced from the longitudinal axis of the fuselage to exert a force on the aircraft tending to change the direction of flight of the aircraft upon the exertion of a torque on the line whose outlet end is positioned to cause the exertion of a forward thrust on the aircraft upon the discharging of a fluid under pressure from said outlet end and whose inlet end is located at a point remote from the aircraft and means for supplying fluid under pressure to said inlet end of the supply line.

5. In a model aircraft adapted to be propelled by fluid under pressure and having a fuselage and laterally extending wings, the center of gravity of said aircraft being located to cause the exertion of a gravitational force tending to rotate the aircraft forwardly and downwardly in flight, a flexible, tubular, pressure fluid supply line connected to the aircraft at a location to exert a force thereon tending to rotate the aircraft rearwardly and upwardly upon the exertion of a rotative force on the line in a direction counter to the direction of said gravitational force and whose outlet end is positioned to cause the exertion of a forward thrust on the aircraft upon the discharge of fluid under pressure from said outlet end and whose inlet end is located at a point remote from the aircraft and means for supplying fluid under pressure to said inlet end of the supply line.

6. In a model aircraft adapted to be propelled by fluid under pressure and having a fuselage and laterally extending wings, a flexible, tubular, pressure fluid supply line connected to the aircraft at a location laterally spaced from the longitudinal axis of the aircraft to exert a force on the aircraft tending to change the direction of flight of the aircraft upon the exertion of a torque on the line whose outlet end is positioned to cause the exertion of a forward thrust on the aircraft upon the discharging of a fluid under pressure from said outlet end and whose inlet end is located at a point remote from the aircraft and means for supplying fluid under pressure to said inlet end of the supply line.

7. In a model aircraft having a fuselage, a flexible, tubular, pressure fluid supply line connected to the fuselage whose outlet end is positioned to discharge fluid under pressure in a direction to exert a forward thrust on the aircraft and whose inlet end is located at a point remote from the aircraft, a container for a volatile liquid under pressure, a volatile fluid in the container at a pressure to maintain the fluid in a liquid condition, a discharge pipe extending into the container and whose inlet end is positioned below the level of the liquid in the container and whose outflow end is in communication with the inlet end of said supply line, and means for regulating the outflow of liquid through said pipe to permit substantially complete evaporation of the liquid in the supply line.

8. In a model aircraft having a fuselage, a flexible, tubular, pressure fluid supply line connected to the fuselage whose outlet end is positioned to discharge fluid under pressure in a direction to exert a forward thrust on the aircraft and whose inlet end is located at a point remote from the aircraft, a container for a volatile liquid under pressure, a volatile fluid in the container at a pressure to maintain the fluid in a liquid condition, a discharge pipe extending into the container and whose inlet end is positioned below the level of the liquid in the container and whose outflow end is in communication with the inlet end of said supply line, and means for regulating the outflow of liquid through said pipe to cause substantially complete evaporation of the liquid in the supply line whereby substantially liquid free fluid is discharged from said outlet.

References Cited in the file of this patent

UNITED STATES PATENTS

| | | |
|---|---|---|
| 1,918,874 | Shannahan | July 18, 1933 |
| 2,484,468 | Schaad | Oct. 11, 1949 |
| 2,643,882 | Dozier | June 30, 1953 |
| 2,676,013 | Walker | Apr. 20, 1954 |
| 2,714,783 | Walker | Aug. 9, 1955 |
| 2,728,495 | Eaton | Dec. 27, 1955 |
| 2,778,543 | Urlaub | Jan. 22, 1957 |
| 2,943,417 | Greenspan et al. | July 5, 1960 |